United States Patent [19]
Bushouse

[11] Patent Number: 5,979,947
[45] Date of Patent: *Nov. 9, 1999

[54] CLAMP FOR EXHAUST PIPES

[76] Inventor: Steven P. Bushouse, 1206 Heather Dr., Holland, Mich. 49423

[ * ] Notice: Under 35 U.S.C. 154(b), the term of this patent shall be extended for 248 days.

[21] Appl. No.: 08/518,784

[22] Filed: Aug. 24, 1995

[51] Int. Cl.⁶ .............................. B65D 63/00; F16L 33/10
[52] U.S. Cl. ............................................. 285/420; 24/276
[58] Field of Search .............................. 285/420; 24/276, 24/275; 403/DIG. 7

[56] References Cited

U.S. PATENT DOCUMENTS

| | | | |
|---|---|---|---|
| D. 252,255 | 7/1979 | Uyeda | 8/394 |
| 2,093,210 | 9/1937 | Powell | 24/276 |
| 3,340,581 | 9/1967 | Engman et al. | 24/276 |
| 3,633,254 | 1/1972 | Hogland | 24/276 |
| 3,774,270 | 11/1973 | Bentley | 24/276 |
| 3,913,188 | 10/1975 | Grassi | 24/276 |
| 3,967,839 | 7/1976 | Dunmire | 285/199 |
| 4,020,533 | 5/1977 | Darling | 24/276 |
| 4,365,392 | 12/1982 | Heckethorn | 24/256 |
| 4,372,017 | 2/1983 | Heckethorn | 24/277 |
| 4,403,378 | 9/1983 | Engman | 285/420 |
| 4,506,418 | 3/1985 | Viola et al. | 285/420 |
| 4,558,891 | 12/1985 | Wagner et al. | 285/322 |
| 5,228,726 | 7/1993 | Brown et al. | 285/187 |

FOREIGN PATENT DOCUMENTS 495336  8/1950  Belgium ................................. 285/420

*Primary Examiner*—Eric K. Nicholson
*Attorney, Agent, or Firm*—Price, Heneveld, Cooper, Dewitt & Litton

[57] ABSTRACT

A clamp assembly which together with a single nut can be used to form a secure lap-joint between overlapped ends of telescoped pipes, includes a yoke having a rigid body defining a concave semicircular pipe-engaging edge, and an elongate member having an arcuate central portion and a pair of parallel legs which extend integrally and tangentially from the arcuate central portion, with one of the legs being pivotally secured to the yoke. A free end of the other leg is threaded for engagement with a nut. The yoke includes a bearing seat upon which the nut can be tightened onto the threaded end of the elongate member to urge the concave semicircular pipe-engaging edge of the web and the concave semicircular pipe-engaging perimeter surface of the elongate member together to apply radially compressive forces about the circumference of overlapped ends of telescoped pipes.

20 Claims, 1 Drawing Sheet

400
CLAMP FOR EXHAUST PIPES

BACKGROUND OF THE INVENTION

This invention relates to connectors for tubular conduits having telescoping ends which overlap, and more particularly to exhaust system clamps for securing together interfitted exhaust pipes and the like.

All types of vehicles, especially automobiles and trucks, employing an internal combustion engine generally have an exhaust system comprised of a muffler, catalytic convertor, resonator, or combination thereof, for treating the exhaust gas before it is discharged into the atmosphere and/or abating noise. The various components of the exhaust system are generally connected together by one or more conduits or pipes to form a continuous pathway for exhaust gases from the exhaust manifold, through the components of the exhaust system and out of the tailpipe.

The major components of the exhaust system such as the muffler, catalytic convertor and resonator are generally provided with an inlet tube and an outlet tube which are welded or otherwise secured to the component in a substantially leak proof, gas-type manner. The inner diameter of the tubes from the components, such as an outlet tube from the muffler, have an inner diameter which is about equal to the outer diameter of the connecting pipes so that an end of a connecting pipe can be slipped over the end of the tube from the muffler or other component to form a slip-joint or lap-joint. In order to secure the overlapped pipes together, a connector is used to apply a substantially uniform, radially inwardly directed compressive force about the circumference of the lap-joint. It is generally desirable to have the connector apply sufficient force uniformly about a circumference of the lap-joint to inwardly deform the overlapping tubes to form a substantially continuous bead or protuberance along the inner surfaces of the pipes.

A variety of clamps have been developed to apply the desired radially inwardly directed compressive forces about the circumference of a lap-joint to secure telescoped pipes together. One of the most common pipe connectors used for connecting exhaust pipes is a guillotine or saddle type clamp comprised of a U-bolt and a saddle or yoke having a web with a semicircular cutout portion. The U-bolt has a substantially semicircular curved section with a radius of curvature which is substantially equal to the outside radius of the outer of the two overlapping tubes or pipes which are to be joined together, and the semicircular cutout of the yoke has a similar radius. The U-bolt also has two parallel legs which extend from the ends of the semicircular curved portion thereof. The yoke is generally prepared from a sheet of steel which is cut, stamped and rolled to provide the web with the semicircular cutout. The yoke also includes apertures or tubular portions for receiving the ends of the U-bolt. The saddle and U-bolt are placed over a lap-joint between telescoped ends of exhaust pipes, with the edge of the semicircular cutout and the inner perimeter of the semicircular portion of the U-bolt facing the outer circumference of the lap joint, and with the ends of the straight leg portions of the U-bolt projecting through the apertures or tubular portions of the yoke. The yoke and U-bolt are then forced toward each other by a pair of nuts threaded on to the ends of the U-bolt legs to apply substantially uniform radially compressive forces continuously around a circumference of the lap-joint.

A disadvantage with conventional saddle or guillotine type clamps is that they include four separate components, including a yoke, a bolt and two nuts, which must be handled and brought together during mounting of the clamp to overlapped ends of exhaust pipes. As a result considerable time and effort must be expended to mount such clamps to connect exhaust pipes. Specifically, mounting requires first properly aligning the U-bolt with the yoke, then inserting the ends of the U-bolt through tubular portions or apertures in the yoke, and finally threading and tightening the two nuts onto the threaded ends of the U-bolt.

Various loop-type circumferential connectors or exhaust clamps comprised of a looped band or bolt having an eyelet or internally threaded extension at one end and an externally threaded extension at the other end have been proposed. Such clamps are disclosed for example in U.S. Pat. Nos. 3,774,270; 4,365,392 and 4,558,891. In each case, the externally threaded extension at one end of the loop is inserted through an eyelet or a tubular extension at the other end, and the nut is threaded and tightened onto the externally threaded extension to cause the loop to contract around the telescoped pipes of an exhaust system.

These loop-type connectors have the advantage of being comprised of only two parts, including a looped band and a nut, whereby mounting of the connector to telescoped pipes is considerably simplified. Specifically, installation typically involves placing the looped band over one end of the tube pipes which are to be connected, inserting the end of the smaller diameter tube into the end of the larger diameter tube to form a slip-joint, repositioning the looped band over a central circumference of the slip-joint if necessary, and threading and tightening a nut onto the externally threaded extension. As an alternative, it may be possible in some cases to connect the ends of the exhaust pipes together first and then slip the loop-type clamp over the unconnected ends one of one of the pipes, slide the clamp along the length of the pipe and over the lap-joint. However, this latter mounting procedure is generally difficult and time consuming at best, and often impractical or impossible.

A resulting disadvantage with the loop-type clamps is that, in general, it is exceedingly difficult or impossible to remove these clamps without first completely separating the pipes on which the clamp is located. Likewise, it must be kept in mind that mounting of the clamp will generally require slipping the clamp over one of the pipe ends which are to be connected together before the tubes are connected. Accordingly, any adjustments which might be required during installation or repair of an exhaust system can be difficult and cumbersome when such loop-type clamps are used.

SUMMARY OF THE INVENTION

This invention provides a simple clamp which can be used in combination with a single nut to connect overlapped ends of telescoped pipes together. The clamp includes a yoke or saddle member and an elongate U-shaped member or bolt which is pivotally secured to the yoke. The elongate member can be rotated between an open position wherein the clamp can be positioned on overlapped ends of telescoped pipes, and a closed position wherein concave arcuate edges defined by the yoke cooperate with an arcuate portion of the elongate U-shaped member to transversely circumscribe the overlapped pipes. The edges of the yoke and the arcuate portion of the elongate member can then be drawn together by tightening a nut on a threaded free end of the elongate member which bears against a surface on the yoke to apply a substantially uniform radially inwardly directed compressive force about the circumference of the lap-joint.

In accordance with a first aspect of the invention, the clamp includes a yoke having a metal sheet which defines a concave semicircular pipe-engaging edge, and a U-bolt having a semicircular pipe-engaging portion and a pair of parallel legs, one of the legs being pivotally secured to the yoke for rotation of the U-bolt about an axis which is perpendicular to the metal sheet defining the pipe-engaging edge. The U-bolt is rotatable between a pipe-engaging position wherein the semicircular pipe-engaging edge of the yoke and the semicircular pipe-engaging portion of the U-bolt can achieve substantially continuous circumferential engagement with the pipe, and an open position wherein the clamp can be installed over a pipe. The other leg of the U-bolt is threaded at its free end for engagement with a nut. The yoke includes a bearing seat upon which the nut can be tightened on the threaded end of the U-bolt to urge the concave semicircular pipe-engaging edge of the yoke and the concave semicircular pipe-engaging portion of the U-bolt together to apply radially compressive forces about the circumference of the overlapped ends of telescoped pipes.

A farther aspect of the invention includes a clamp assembly having a yoke with a web defining a concave, semicircular edge for engaging a cylindrical pipe, and an elongate member having an arcuate central portion and a pair of parallel legs which extend integrally and tangentially from the arcuate central portion. The arcuate central portion has a concave semicircular perimeter with a radius of curvature which is substantially equal to that of the concave, semicircular edge of the yoke. The elongate member is pivotally mounted on the yoke for rotation between an open position wherein the clamp can be installed over a pipe and a closed position wherein the semicircular edge of the yoke and the semicircular perimeter of the elongate member can substantially transversely circumscribe overlapped ends of telescoped pipes. A free end of one of the legs is threaded for engagement with a nut. The yoke includes a bearing seat upon which a nut can be tightened on the threaded end of the elongate member to urge the concave semicircular pipe-engaging edge of the web and the semicircular pipe-engaging perimeter surface of the elongate member together to apply radially compressive forces about the circumference of overlapped ends of telescoped pipes.

In accordance with another aspect of the invention, a clamp assembly is provided which includes a yoke having a pair of parallel side webs and a bottom web connecting the side webs, with each of the side webs defining congruous, concave semicircular pipe-engaging edges. Each of the semicircular edges has a radius of curvature which is substantially equal to the outer radius of a pipe which is to be clamped. An elongate member having an arcuate central portion and a pair of parallel legs extending integrally and tangentially from the arcuate central portion is pivotally secured to the web. The arcuate central portion has a concave semicircular, pipe-engaging perimeter surface with a radius of curvature which is substantially equal to the radius of curvature of the concave semicircular edges of the yoke. One of the legs of the elongate member is pivotally secured to the yoke for rotation in a plane between the parallel side webs. The other leg is threaded at its free end for engagement with a nut. The yoke includes a bearing seat upon which a nut can be tightened upon the threaded end of the elongate member to urge the concave semicircular pipe-engaging edges of the web and the concave semicircular pipe-engaging perimeter surface of the elongate member together to apply radially compressive forces about the circumference of the overlapped ends of telescoped pipes.

The invention provides a clamp which can be quickly and easily applied to a lap-joint and tightened together with a single nut to secure the overlapped ends of telescoped pipes together. In addition to having fewer components, whereby mounting and removal of the clamp assembly is simplified, the clamp assembly of the invention can be easily manufactured using conventional materials and manufacturing techniques employed in the production of conventional saddle clamps.

DESCRIPTION OF THE PREFERRED EMBODIMENT

Figure 1:
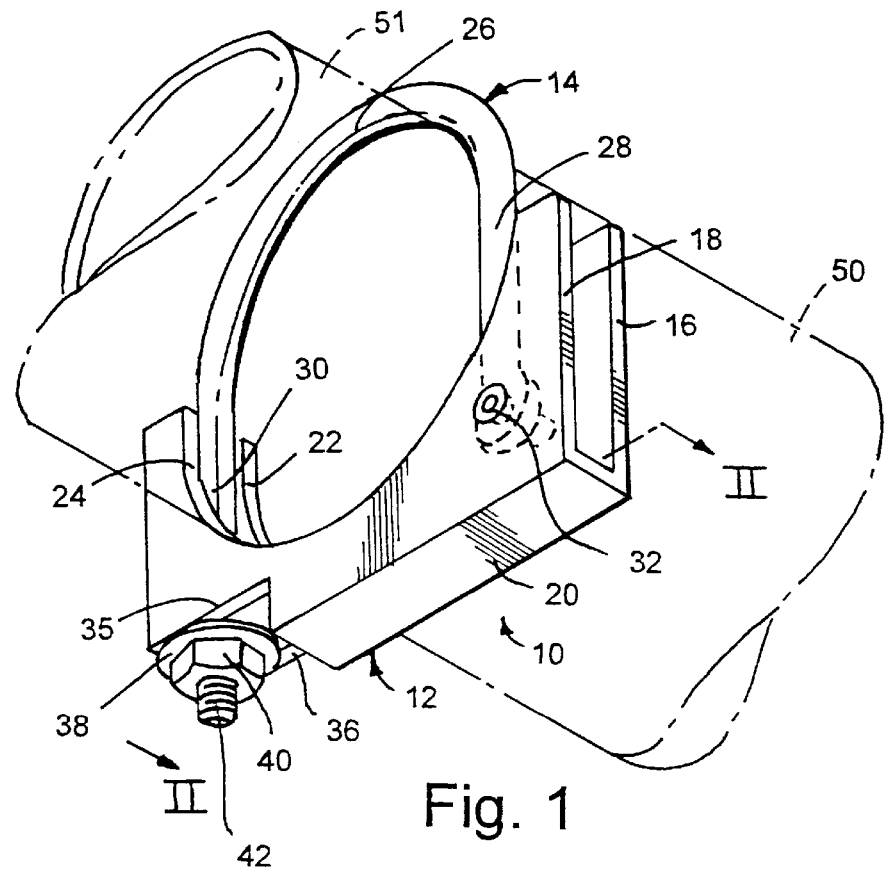
FIG. 1 is a perspective view of a clamp assembly in accordance with the invention mounted on a lap-joint formed by telescoped ends of pipes which are to be connected together, the pipes being shown in phantom outline.
Figure 2:
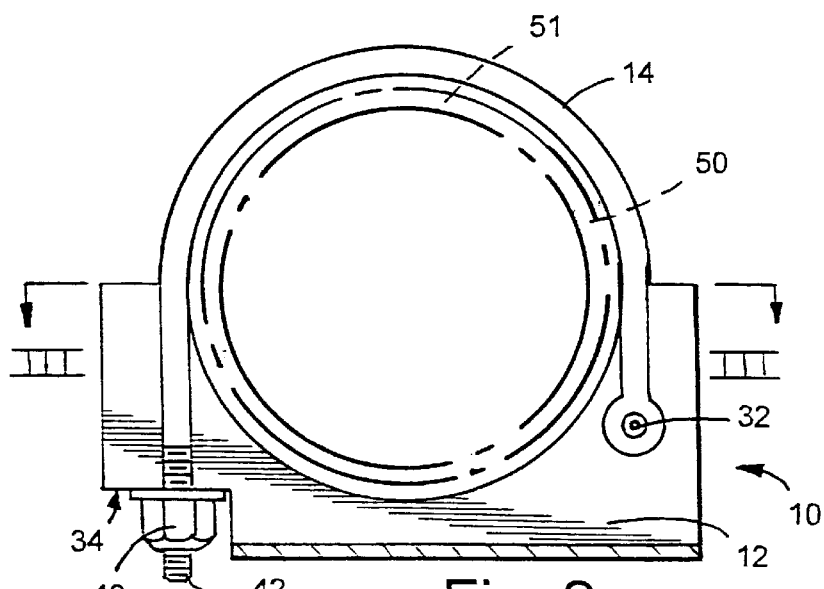
FIG. 2 is a cross section view of the clamp assembly as viewed along lines II—II of FIG. 1.
Figure 3:
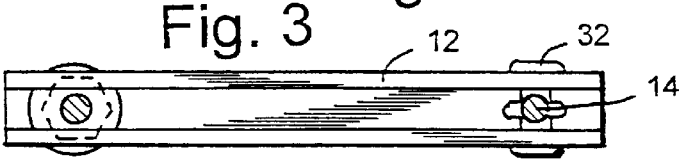
FIG. 3 is a top plan view in partial cross section as seen along lines III—III of FIG. 2.

In FIG. 1, there is shown a clamp assembly 10 in accordance with the invention. The clamp assembly 10 includes a saddle or yoke 12, and a U-shaped elongate member or bolt 14. Yoke 12 includes a pair of parallel side webs 16,18 and a bottom web 20 connecting the side webs together. Each of the side webs 16,18 defines a concave semicircular edge 22,24 respectively. The semicircular edges 22,24 are congruous, i.e., the edges 22 and 24 are substantially identical and define parallel pipe-engaging surfaces. The U-shaped member or U-bolt 14 has an arcuate central portion 24 and a pair of parallel legs 28,30 which extend integrally and tangentially from the arcuate central portion. The inner perimeter 32 of arcuate central portion 26 defines a substantially semicircular pipe-engaging surface. Leg 28 of U-bolt 14 is pivotally secured to yoke 12 for rotation about a pin or rivet 32. The end of leg 28 is preferably secured to yoke 12 by means of a rivet 32 which passes through side webs 16 and 18, and through an eyelet or aperture formed at the end of leg 28. Yoke 12 is suitably cut, blanked or otherwise formed to provide a notch in the bottom web 20 which serves as a bearing seat 34 comprised of web edges 35,36 which are generally parallel to each other and perpendicular to and disposed on opposite sides of the longitudinal axis of leg 30. Flange portion 38 of shouldered nut 40 bears upon web edges 35,36 of bearing seat 34 when tightened onto a threaded free end 42 of leg 30 to urge the concave semicircular pipe-engaging edges of webs 16,18 and the concave semicircular pipe-engaging perimeter surface of U-bolt 14 together to apply radial compressive forces about the circumference of overlapped ends of telescoped pipes. As can be seen in the drawings, the space between webs 16 and 18 is generally clear and substantially unobstructed so that bolt 14 can be freely rotated from an open position wherein clamp 10 can be positioned around a split-joint between two telescoped pipes, and a closed position as shown in the figures. More specifically the ends of the yoke 12 are open so that the U-bolt 14 can be rotated (clockwise with respect to the orientation shown in FIG. 2) about rivet 32 through an angle in excess of 90 degrees.

Clamp assembly 10 is preferably prepared from materials which are used in the manufacture of conventional saddle clamps. The yoke 12 and U-bolt 14 are preferably made of steel. The yoke can, for example, be made of reinforced 11-gage steel sheet material, and a ⅜ inch heavy duty U-bolt 14 can be utilized. The saddle or yoke 12 can be formed using various well known metal forming techniques. The yoke can, for example, be made by suitably cutting and bending a steel sheet to form a saddle-shaped member having parallel side webs 16,18 and a connecting bottom web 20, and which has an overall U-shape when viewed from an end along a line of sight parallel to the webs 16,18,20. U-bolt 14 can be pivotally secured to the yoke 12 in any suitable manner. The presently preferred method of pivotally securing the U-bolt 14 to yoke 12 is by forming a loop or eyelet at the end of leg 28, cutting or otherwise providing perpendicularly aligned apertures through web 16,18 and securing U-bolt 14 to yoke 12 by passing a steel rivet or pin 32 through the aligned apertures in webs 16,18 and through an eyelet or aperture in leg 28, which is disposed between webs 16,18.

Installation of clamp assembly 10 on overlapping ends of telescoped pipes 50,51 is relatively simple and involves merely positioning clamp 10 over a lap-joint, rotating yoke 12 relative to U-bolt 14 into the closed position substantially as shown in the drawings, and urging yoke 12 and U-bolt 14 toward each other by tightening nut 40 onto threaded end 42 of leg 30. Nut 40 is typically tightened sufficiently to crimp the overlapped tubes together to provide a strong secure joint.

The embodiments of the invention in which an exclusive property or privilege is claimed are defined as follows:

1. A clamp assembly, comprising:
   a yoke have a rigid body defining a concave, generally semicircular pipe-engaging edge for clamping against an associated pipe;
   a U-bolt having a generally semicircular pipe-engaging portion, an end of said U-bolt being pivotally attached to said yoke for rotation of said U-bolt about a pin having an axis substantially perpendicular to said body, said U-bolt being rotatable between a pipe-engaging position wherein said pipe-engaging edge of said yoke and said pipe-engaging portion of said U-bolt achieve substantially continuous circumferential engagement with the pipe and an open position wherein said clamp can be installed over the pipe, the other end of said U-bolt being threaded at its free end and receiving a nut thereon, said yoke including a bearing seat upon which said nut is tightened on said threaded end of said U-bolt to urge said pipe-engaging edge of said yoke and said pipe-engaging portion of said U-bolt together to apply radially compressive forces about the circumference of the pipe.

2. The clamp assembly of claim 1, wherein the yoke includes a pair of parallel side webs and a connecting bottom web which have an overall U-shape when viewed along a line of sight parallel to the webs.

3. The clamp assembly of claim 2, wherein the ends of the yoke are open to allow said U-bolt to be pivoted between an open position wherein the clamp assembly can be positioned around a pipe, and a closed position wherein said U-bolt together with said pipe-engaging edge of said yoke apply radially compressive forces about the circumference of the pipe.

4. The clamp assembly of claim 3, wherein said bearing seat is formed by providing a notch in said bottom web, said notch forming web edges which are generally parallel to each other and perpendicular to and disposed on opposite sides of a longitudinal axis of the threaded end of said U-bolt.

5. The clamp assembly of claim 4, wherein said U-bolt can be rotated with respect to said yoke through an angle in excess of 90 degrees.

6. The clamp assembly of claim 5, wherein said yoke is comprised of steel sheet.

7. The clamp assembly of claim 6, wherein said pin is a rivet.

8. A clamp assembly, comprising:
   a yoke having a web defining a concave semicircular edge for engaging a cylindrical pipe; and
   an elongate member having an arcuate central portion including a concave semicircular perimeter with a radius of curvature substantially equal to that of said concave semicircular edge of said yoke, said elongate member being pivotally attached at an end thereof to said yoke for rotation, about a pin, between an open position wherein said clamp can be installed over a pipe and a closed position wherein said semicircular edge of said yoke and semicircular perimeter of said elongate member can substantially transversely circumscribe overlapped ends of telescoped pipes;
   a free end of said elongate member being threaded, said yoke including a bearing seat upon which a nut can be tightened on said threaded end of said elongate member to urge said concave semicircular pipe-engaging edge of said web and said concave semicircular pipe-engaging perimeter surface of said elongate member together to apply radially compressive forces about the circumference of overlapped ends of telescoped pipes.

9. The clamp assembly of claim 8, wherein the yoke includes a pair of parallel side webs and a connecting bottom web which have an overall elongate member when viewed along a line of sight parallel to the webs.

10. The clamp assembly of claim 9, wherein the ends of the yoke are open to allow said elongate member to be pivoted between an open position wherein the clamp assembly can be positioned around a pipe, and a closed position wherein said elongate member together with said pipe-engaging edge of said yoke apply radially compressive forces about the circumference of the pipe.

11. The clamp assembly of claim 10, wherein said bearing seat is formed by providing a notch in said bottom web, said notch forming web edges which are generally parallel to each other and perpendicular to and disposed on opposite sides of a longitudinal axis of said threaded end of said U-bolt.

12. The clamp assembly of claim 11, wherein said elongate member can be rotated with respect to said yoke through an angle in excess of 90 degrees.

13. The clamp assembly of claim 12, wherein said yoke is comprised of steel sheet.

14. The clamp assembly of claim 13, wherein said pin is a rivet.

15. The clamp assembly of claim 14, wherein said elongate member is a U-bolt.

16. A clamp assembly, comprising:
   a yoke having a pair of parallel side webs and a bottom web connecting said side webs, said side webs defining congruous, concave semicircular pipe-engaging edges, said semicircular edges having a radius of curvature substantially equal to an outer radius of a pipe which is to be clamped; and
   an elongate member having an arcuate central portion including a concave semicircular pipe-engaging perimeter surface with a radius of curvature substantially equal to the radius of curvature of said concave, semicircular edges of said yoke, an end of said elongate member being pivotally attached to said yoke for rotation about a pin having an axis substantially perpendicular to said parallel side webs, another end of said elongate member being threaded, said yoke including a bearing seat upon which a nut can be tightened on said threaded end of said elongate member to urge said concave semicircular pipe-engaging edges of said webs and said concave semicircular pipe-engaging perimeter surface of said elongate member together to apply radially compressive forces about the circumference of overlapped ends of telescoped pipes.

17. The clamp assembly of claim 16, wherein the parallel side webs and connecting bottom web have an overall U-shape when viewed along a line of sight parallel to the webs.

18. The clamp assembly of claim 17, wherein the ends of the yoke are open to allow said elongate member to be pivoted between an open position wherein the clamp assembly can be positioned around a pipe, and a closed position wherein said elongate member together with said pipe-engaging edge of said yoke apply radially compressive forces about the circumference of the pipe.

19. The clamp assembly of claim 18, wherein said bearing seat is formed by providing a notch in said bottom web, said notch forming web edges which are generally parallel to each other and perpendicular to and disposed on opposite sides of a longitudinal axis of said threaded end of said U-bolt.

20. The clamp assembly of claim 19, wherein said elongate member can be rotated with respect to said yoke through an angle in excess of 90 degrees.

* * * * *

UNITED STATES PATENT AND TRADEMARK OFFICE
CERTIFICATE OF CORRECTION

PATENT NO. : 5,979,947
DATED : November 9, 1999
INVENTOR(S) : Steven P. Bushouse It is certified that error appears in the above-identified patent and that said Letters Patent is hereby corrected as shown below:

Column 3, line 20:

"farther" should be - -further- -;

Column 5, line 26:

"have" should be - -having- -.

Signed and Sealed this

Twenty-fifth Day of July, 2000

Attest:

Q. TODD DICKINSON

*Attesting Officer*      *Director of Patents and Trademarks*